(12) United States Patent
Mimori et al.

(10) Patent No.: US 7,525,879 B2
(45) Date of Patent: Apr. 28, 2009

(54) OBJECTIVE OPTICAL ELEMENT AND OPTICAL PICKUP APPARATUS

(75) Inventors: Mitsuru Mimori, Kokubunji (JP); Junji Hashimura, Sagamihara (JP); Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 739 days.

(21) Appl. No.: 11/076,232

(22) Filed: Mar. 10, 2005

(65) Prior Publication Data
US 2005/0201250 A1    Sep. 15, 2005

(30) Foreign Application Priority Data
Mar. 15, 2004   (JP)   ............... 2004-073024

(51) Int. Cl.
*G11B 7/00*   (2006.01)
(52) U.S. Cl. ............... 369/12.08; 369/112.04
(58) Field of Classification Search ............ 369/112.01, 369/112.05, 112.23; *G11B 7/00*
See application file for complete search history.

(56) References Cited

U.S. PATENT DOCUMENTS 7,206,276 B2 *  4/2007  Kimura et al. .......... 369/112.08
7,239,596 B2 *  7/2007  Saitoh et al. ........... 369/112.05
7,289,415 B2 * 10/2007  Ikenaka et al. ......... 369/112.05
7,292,517 B2 * 11/2007  Hendriks et al. ....... 369/112.26
7,324,424 B2 *  1/2008  Kim et al. .............. 369/112.07

OTHER PUBLICATIONS

PGPUB—2005/0190679 A1, all pages—Mimori, 369/112.05, equivalent of copending sn 11/063994.*

* cited by examiner

*Primary Examiner*—Joseph Feild
*Assistant Examiner*—Joseph Haley
(74) *Attorney, Agent, or Firm*—Finnegan, Henderson, Farabow, Garrett & Dunner, L.L.P.

(57) ABSTRACT

An objective optical element for use in an optical pickup apparatus first-third light sources emitting first-third light fluxes and a light converging optical system, includes a first optical path difference providing structure for providing an optical path difference which provides a substantial phase change to the third light flux and does not provide a substantial phase change to the first and second light fluxes; and a second optical path difference providing structure for providing an optical path difference to the first light flux, the second light flux and the third light flux, wherein the objective optical element converges the first-third light fluxes through the protective layers with the thicknesses t1-t3 onto an information recording surface of the first-third optical information media respectively.

30 Claims, 7 Drawing Sheets

OPTICAL AXIS L

OPTICAL AXIS L

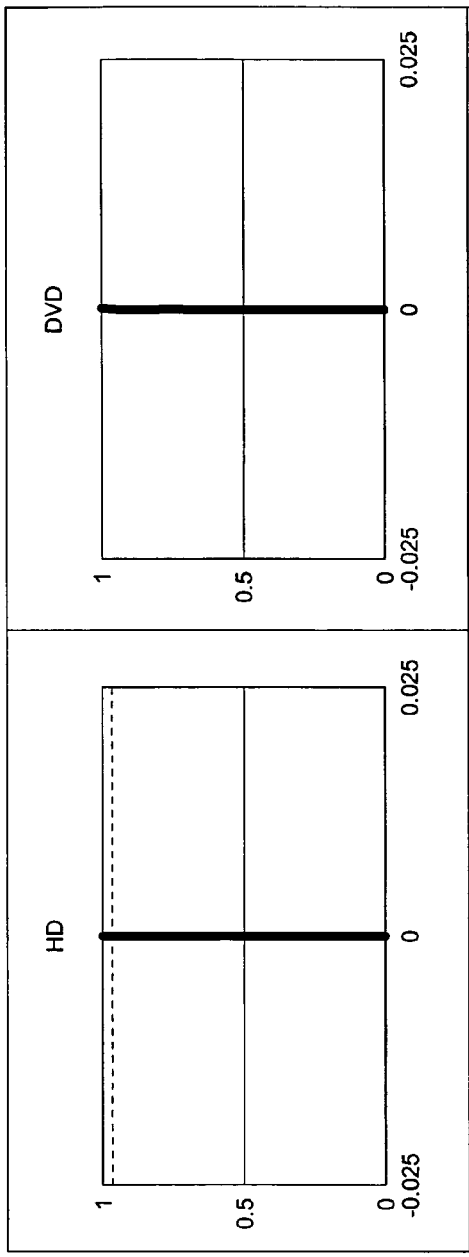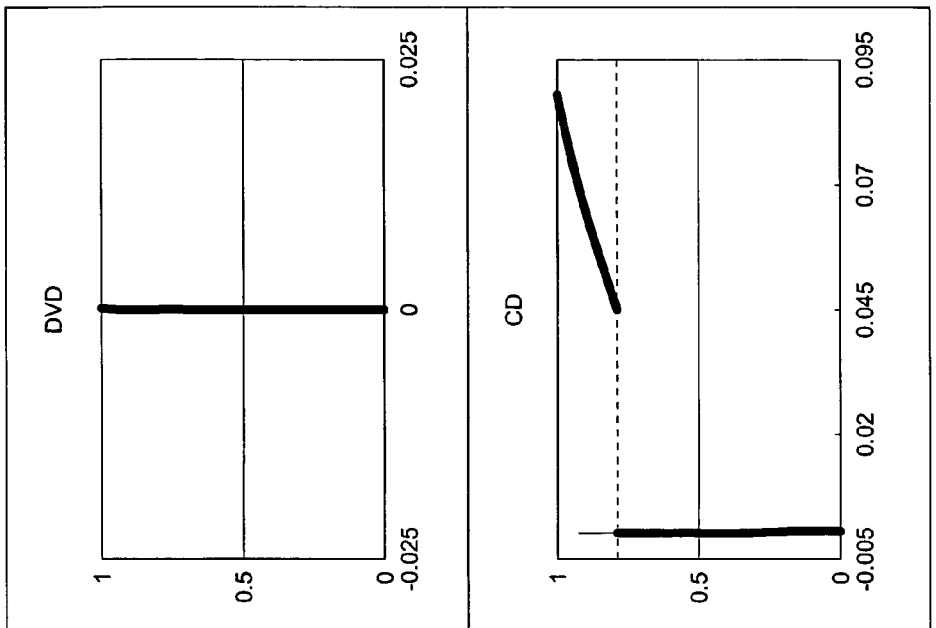
FIG. 4 (a) HD
FIG. 4 (b) DVD
FIG. 4 (c) CD

DVD

CD

HD DVD

OBJECTIVE OPTICAL ELEMENT AND OPTICAL PICKUP APPARATUS

FIELD OF THE INVENTION

The present invention relates to an optical pickup apparatus, and particularly, to an optical pickup apparatus which can recording and/or reproducing information respectively on 3 or more different optical information recording media by using light fluxes with different wavelengths emitted from 3 light sources.

BACKGROUND OF THE INVENTION

Recently, in the optical pickup apparatus, the wavelength-shortening of the laser light source used as the light source for reproducing of the information recorded in an optical disk or recording of the information in the optical disk is advanced. For example, a laser light source of wavelength 405 nm such as a blue-violet semiconductor laser, or a blue-violet SHG laser which conducts the wavelength conversion of the infrared semiconductor laser by using the second harmonic wave generation is putting to a practical use.

When these blue-violet laser light sources are used, in the case where an objective lens of the same numerical aperture (NA) as DVD (Digital Versatile Disk) is used, the information of 15-20 GB can be recorded in an optical disk of diameter 12 cm, and in the case where NA of the objective lens is increased to 0.85, the information of 23-25 GB can be recorded in the optical disk of diameter 12 cm. Hereinafter, in the present specification, the optical disk and photo-magnetic disk for which the blue-violet laser light source is used, are generally referred as "high density optical disk".

Hereupon, only by saying that the information can be adequately recorded and/or reproduced for such a high density optical disk, it is difficult to be said that a value as a product of the optical disk player and/or recorder is enough. In the present time, DVD or CD (Compact Disc) in which various information are recorded is put in a market. When the actuality is based on, by only a case where the information can be recorded and/or reproduced for the high density optical disk, it is insufficient, and for example, a fact that the information can be adequately recorded and/or reproduced in the same manner also for a user-own DVD or CD, introduces to a fact that a commercial value as the optical disk player and/or recorder is increased. For such a background, it is desirable that the optical pickup apparatus mounted in the optical disk player/recorder for the high density optical disk has a performance by which the information can be adequately recorded and/or reproduced while the compatibility is being kept with also any one of 3 kinds of optical disks of the high density optical disk, DVD and CD.

As a method by which the information can be adequately recorded and/or reproduced while the compatibility is being kept with also any one of the high density optical disk and DVD, furthermore, CD, a method by which an optical system for the high density optical disk and an optical system for DVD or CD are selectively switched corresponding to the recording density of the optical disk for which the information is recorded and/or reproduced, can be considered. However, because a plurality of optical systems are necessary for the method, it is disadvantageous for down-sizing, further, the cost is increased.

Accordingly, for the purpose to intend that the structure of the optical pickup apparatus is simplified and the cost is reduced, can be said that even in the optical pickup apparatus having the compatibility, it is preferable that the common optical system for the high density optical disk and for DVD or CD is used and the number of parts structuring the optical pickup apparatus are reduced at most. Further, it is most advantageous that the common objective optical system arranged in opposite to the optical disk is used with each other, in the simplification of the structure of the optical pickup apparatus and the cost reduction.

Hereupon, in the case where it is intended to realize the compatibility by using the common objective optical system in the optical pickup apparatus, the light source wavelengths or the protective substrate thicknesses used for respective optical disks are different. Therefore, it is necessary that any scheme for forming a light converged spot whose aberration is finely corrected on the information recording surface of the optical disk.

As a mode of the aberration correction, it is considered that a divergence angle of the light flux entering into the objective optical element is changed. According to a mode of such an aberration correction, there is a problem that, the off-axis performance is worsened (i.e. the coma is more largely generated when the lens shift is conducted at the time of the tracking, as larger the degree of divergence is) corresponding to the degree of divergence of the light flux entering into the objective optical element, and it is not preferable.

As another mode of aberration correction, a diffractive structure giving the diffractive action is provided on the optical surface of the objective optical element (for example, refer to Patent Document 1).

(Patent Document 1) Tokkai No. 2002-298422

However, according to such a conventional technology, when the light fluxes entering into the objective optical element have 2 different wavelengths, the spherical aberration correction can be finely conducted also for any light flux, however, for the light fluxes of 3 different wavelengths, it is difficult that the spherical aberration correction can be finely conducted also for any light flux.

When more specifically described, for example, the wavelengths used for the high density optical disk, DVD and CD, are respectively, $\lambda 1$ is about 400 nm, $\lambda 2$ is about 655 nm, and $\lambda 3$ is about 785 nm. Herein, because $\lambda 1:\lambda 3 \approx 1:2$, in the blaze shaped diffractive structure written in Patent Document 1, a ratio of diffraction order in which the diffraction efficiency is the maximum, is $\lambda 1:\lambda 3=2:1$. For example, when $\lambda 1$ is the 6-th order, $\lambda 3$ is the 3-rd order. Further, because the effect of the diffraction is determined by the wavelength×the difference of diffraction order, and a pitch of diffractive ring-shaped zone. When a ratio of diffraction orders of the wavelengths $\lambda 1$ and $\lambda 3$ is 2:1, a value of $\lambda 1 \times 2 - \lambda 3 \times 1$ is decreased. For example, when the diffractive structure is designed as the blaze wavelength is a value close to the even number times of the wavelength $\lambda 1$, the mutual diffractive action in the light flux of the wavelength $\lambda 1$ and the light flux of the wavelength $\lambda 3$ is decreased, and it becomes difficult that the recording and/or reproducing of the information is respectively conducted on the high density optical disk and CD by using the same objective optical element.

On the one hand, even when the difference of the wavelength×diffraction order is small, it is theoretically possible that the compatibility can be attained when a small diffractive action is used. However, in this case, it is necessary that a pitch of the diffractive ring-shaped zone is decreased. Thereby, problems are generated in which the light amount is lowered, manufacturing of the lens becomes difficult, and the aberration is largely generated due to the wavelength variation within the minute range of several nm by the output change of the laser light source.

SUMMARY OF THE INVENTION

The present invention is attained in view of problems of the conventional technology, and an object of the invention is to provide an objective optical element by which a fine spherical aberration correction can be conducted, even when light fluxes having 3 different wavelengths are incident.

An objective optical pickup apparatus relating to the present invention, corrects spherical aberration or wavefront aberration by providing optical path difference so as to change phase amount only for the light flux with wavelength $\lambda 3$ using the first diffractive structure. Further, the objective optical pickup apparatus corrects spherical aberration or wavefront aberration by providing optical path difference for the light fluxes with wavelengths $\lambda 1$ and $\lambda 2$ using the second diffractive structure. It lightens design load caused by a problem in conventional technique and the whole system of the optical pickup apparatus conducts information recording and/or reproducing properly by correcting aberration for the three light fluxes with different wavelengths. It lightens the burden on designing caused by the problem in the conventional technique, and records and/or reproduces information properly by correcting the aberration totally conducted for all of light fluxes with 3 different wavelengths.

BRIEF DESCRIPTION OF THE DRAWINGS

FIGS. 4(a)-4(c) are views of the longitudinal spherical aberration of the light flux (HD) of wavelength $\lambda 1$, the light flux (DVD) of wavelength $\lambda 2$ and the light flux (CD) of wavelength $\lambda 3$ in Example 1.

DETAILED DESCRIPTION OF THE INVENTION

Figure 1:
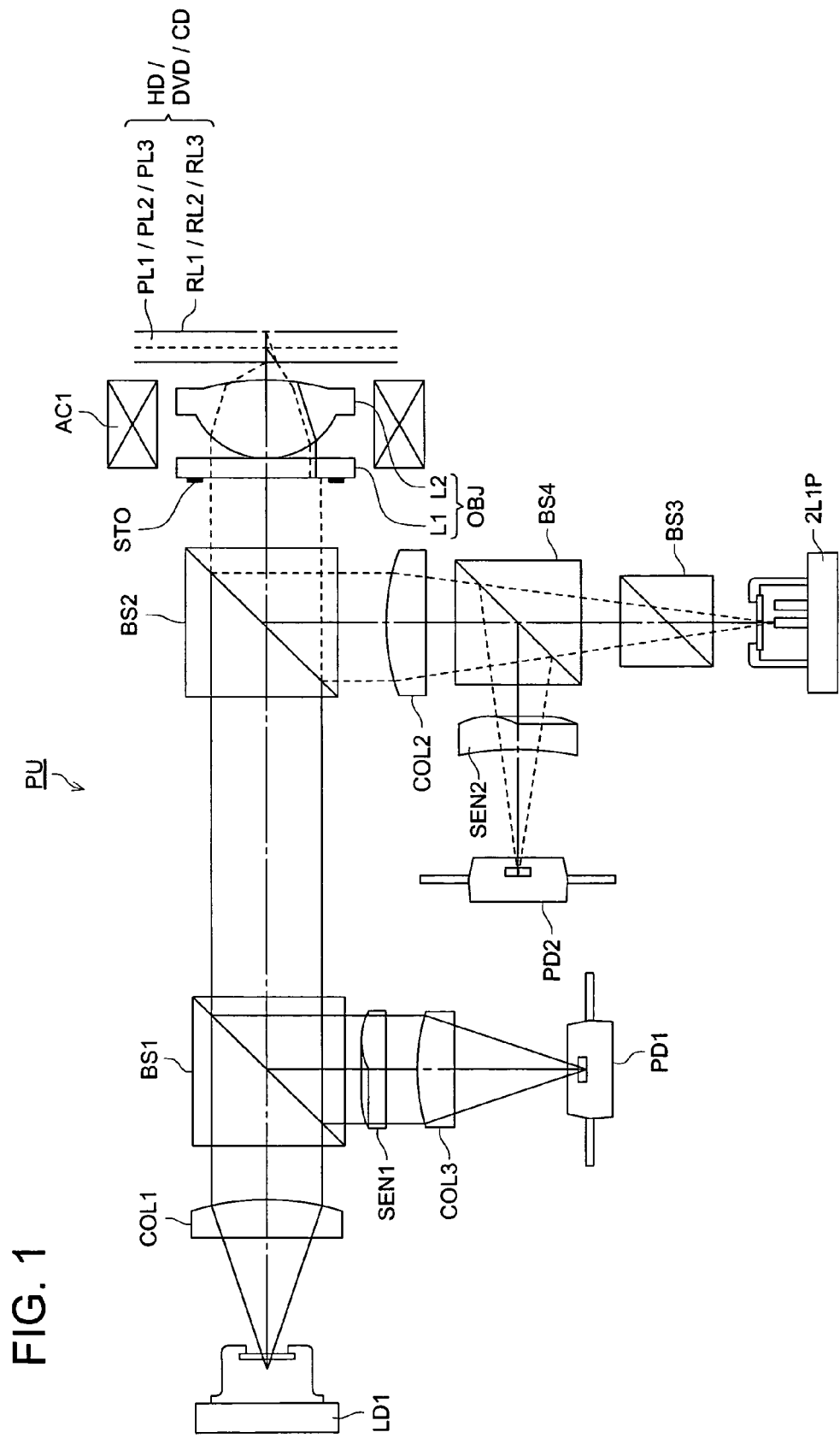
FIG. 1 is an outline sectional view of an optical pickup apparatus according to the present embodiment.

A preferred structure of the present invention will be described below.

An objective optical element written in item 1 is an objective optical element for use in an optical pickup apparatus having a first light source, a second light source, a third light source, and a light converging optical system having an objective optical element. The first light source emitting a first light flux with a first wavelength $\lambda 1$ for recording and/or reproducing information on an information recording surface of a first optical information recording medium having a protective layer with a thickness t1. The second light source emitting a second light flux with a second wavelength $\lambda 2$ ($\lambda 1 < \lambda 2$) for recording and/or reproducing information on an information recording surface of a second optical information recording medium having a protective layer with a thickness t2 ($t1 \leq t2$).

The third light source emitting a third light flux with a third wavelength $\lambda 3$ ($\lambda 2 < \lambda 3$) for recording and/or reproducing information on an information recording surface of a second optical information recording medium having a protective layer with a thickness t3 ($t2 < t3$).

The objective optical element includes a first optical path difference providing structure for providing an optical path difference which provides a substantial phase change to the third light flux and does not provide a substantial phase change to the first and second light fluxes; and a second optical path difference providing structure for providing an optical path difference to the first light flux, the second light flux and the third light flux. The objective optical element converges the first-third light fluxes through the protective layers with the thicknesses t1-t3 onto an information recording surface of the first-third optical information media respectively.

According to the present invention, a case where it is difficult that the aberration correction is conducted so that the recording and/or reproducing of the information can be adequately conducted for all of light fluxes of 3 different wavelengths, for example, by using a single difftactive structure, is considered. In the present invention, the recording and/or reproducing of the information can be adequately conducted, in the case where, by using the first diffractive structure, when the optical path difference is previously given only to the light flux of wavelength $\lambda 3$ so that the phase is changed, the spherical aberration or the, wavefront aberration is corrected, further, by using the second diffractive structure, when the optical-path difference is mainly given to the light fluxes of wavelengths $\lambda 1$, $\lambda 2$, the spherical aberration or the wavefront aberration is corrected, and the burden is lightened, and the aberration correction is totally conducted for all of light fluxes of 3 different wavelengths.

The objective optical element written in item 2 is the structure written in item 1, wherein when the optical pickup apparatus reproduces and/or records information on the first optical information recording medium, the second optical information recording medium and the third optical information recording medium, image forming magnifications of the objective optical element for the first-third information recording media are almost same each other.

"Image forming magnifications are almost same" indicates that, to the light flux of wavelength $\lambda 2$, the difference of the image forming magnification of the light flux of other wavelengths is within ±0.008.

The objective optical element written in item 3 is the structure written in item 2, wherein each of the image forming magnifications of the objective optical element is 0. When the parallel light fluxes of all wavelengths $\lambda 1$-$\lambda 3$ are made to be entered in the objective optical element, the off-axis performance of the objective optical element is improved. For example, even when the objective optical element is shifted in the track direction, the generation of the coma or the astigmatism can be suppressed. Further, the light source in which a plurality of light sources packaged into one body, can be used, and the reduction of the number of parts, the size-reduction of the optical pickup apparatus, and the cost reduction can be realized.

The objective optical element written in item 4 is the structure written in any one of items 1-3, wherein the first optical path difference providing structure is a diffractive structure. However, it may also be a NPS (Non-Periodic Surface).

The objective optical element written in item 5 is the structure written in any one of items 1-3, wherein the first optical path difference providing structure includes a predetermined number of discontinuous portions formed periodically. Each of the discontinuous portions includes a groove and is formed in a concentric-circle shape whose center is on an optical axis, a step depth of the groove is regulated so as not to provide a substantial phase change to the light flux with wavelength λ1 passing through the discontinuous portions and the light flux with wavelength λ2 passing through the discontinuous portions, and to provide a substantial phase change to the light flux with wavelength λ3 passing through the discontinuous portions. Therefore, by giving such a change of the phase, the aberration can be corrected. When the depth of the groove and number of steps are made into predetermined values, the diffractive action can be given to a specific wavelength. Hereupon, a phrase that "not to provide a substantial-phase change" does not indicate only a case where there is entirely no change of the phase, but when there is a change of the phase within ±0.2 π (preferably, within 0.1 π), it is included. A phrase that "to provide a substantial phase change" indicates a case there is a change of the phase more than +0.2 π or less than −0.2 π, is included.

The objective optical element written in item 6 is the structure written in item 5, wherein the objective optical element satisfies, $$4.7 \times d \leq d1 \leq 5.3 \times d \quad (1)$$

$$2 < m1 \leq 5 \quad (2)$$

where n1 is a refractive index of the objective optical element comprising the first optical path difference providing structure for the wavelength λ1, d1 is a depth along the optical axis of the groove of the first optical path difference providing structure, m1 is a integer number and a number of the discontinuous portions and $d = \lambda1/(n1-1)$.

For example, when the number of divided portions is small like as m1=2, there is an advantage that the objective optical element is easily produced.

The objective optical element written in item 7 is the structure written in any one of items 1-4, wherein the second optical path difference providing structure has a serrated cross sectional shape and generates a L-th order diffracted light flux for being formed into a converged spot on the first optical information recording medium, a M-th order diffracted light flux for being formed into a converged spot on the second optical information recording medium, a N-th order diffracted light flux for being formed into a converged spot on the third optical information recording medium where N is an integer number, L is 2N and M is an integer number. That is, when the diffraction order in which the diffraction efficiency in the wavelength λ1 is the maximum, is made to be an even number, the diffraction efficiencies of both light fluxes of the wavelengths λ1, λ3 transmitting the second optical path difference providing structure are increased. On the one hand, in the first optical path difference providing structure, in the case where the wavelength difference which is not integer-times is given only to the light flux of wavelength λ3, (integer-times wavelength difference is given to light fluxes of other 2 wavelengths), when transmitting the first optical path difference providing structure, the correction of the aberration of the light flux of the wavelength, which is under-correction, can be conducted.

The objective optical element written in item 8 is the structure written in item 7, wherein L, M, and N satisfies L=2, M=1, N=1.

The objective optical element written in item 9 is the structure written in item 7, wherein L, M, and N satisfies L=6, M=4, N=3.

The objective optical element written in item 10 is the structure written in item 7, wherein L, M, and N satisfies L=8, M=5, N=4.

The objective optical element written in item 11 is the structure written in item 7, wherein L, M, and N satisfies L=10, M=6, N=5.

In the structure written in any one of items 7-11, the objective optical element written in item 12 satisfies η1>80%, η2>70% and η3>80%, wherein η1 is a diffraction efficiency of the L-th order diffracted light flux with a wavelength λ1 passing through the second optical path difference providing structure, η2 is a diffraction efficiency of the M-th order diffracted light flux with a wavelength λ2 passing through the second optical path difference providing structure, λ3 is a diffraction efficiency of the N-th order diffracted light flux with a wavelength λ3 passing through the second optical path difference providing structure.

When unwanted light fluxes for information reproducing/recording of the optical disk (i.e., a light flux with low diffraction efficiency which is not used for reproducing/recording of an optical disk) increases, a noise in signal increase and it worsen S/N. Therefore, it is preferable that each of η1 and η2 is diffraction efficiency of a light flux with as much as highest diffraction efficiency in order to improve S/N. For example, it is the preferable that when a light flux has passed the objective optical element, then is reflected by an information recording surface and passes through the objective optical element again, the light flux has a diffraction efficiency of 50% or more.

When the first optical path difference providing structure provides a diffractive action to the N-th diffracted light of λ3, reduction of the diffraction efficiency is expected. Therefore, it is preferable that η3 is a diffraction efficiency of the light flux with as much as high diffraction efficiency.

The objective optical element written in item 13 is the structure written in any one of items 1-11, wherein the wavelength λ1, wavelength λ2 and wavelength λ3 satisfy $$370\text{nm} < \lambda1 < 450\text{nm} \quad (3)$$

$$620\text{nm} < \lambda2 < 690\text{nm} \quad (4)$$

$$750\text{nm} < \lambda3 < 830\text{nm}. \quad (5)$$

The objective optical element written in item 14 is the structure written in any one of items 1-13, wherein the objective optical element includes 2 elements of a first optical element arranged at the light source side and a second optical element arranged at the optical information recording medium side. When the objective optical element includes 2 or more optical elements, the degree of freedom of the correction function is increased, and becomes advantageous in the design work, performance, however, the objective element may also be formed of a single element.

The objective optical element written in item 15 is the structure written in item 14, wherein the first optical path difference providing structure is arranged on the first optical element, and the second optical path difference providing structure is arranged on the second optical element. When one optical path difference providing structure is provided in a single optical element, the allowable range of the molding error of the optical element single body can be made larger than a case where 2 diffractive structures are provided in one optical element.

The objective optical element written in item 16 is the structure written in item 14, wherein the first optical path difference providing structure is arranged on one surface of the first optical element, and the second optical path difference providing structure is arranged on an opposite surface of the first optical element. When the objective lens such as glass lenses for which the manufacturing of the diffraction shape is difficult, is made the second optical element, the above description is an effective structure.

The objective optical element written in item 17 is the structure written in any one of items 14-16, wherein the first optical path difference providing structure is arranged on the light-source side optical surface of the first optical element. For example, in the groove-shaped optical path difference providing structure, the step depth in the optical axis direction is larger than in the serrated optical path difference providing structure, and the eclipse of the ray of light is generated by the oblique incidence. Hereby, the lowering of the diffraction efficiency is generated. For the purpose to decrease that, it is desirable that the groove-shaped structure is provided at the position on which the light fluxes of wavelengths $\lambda 1$, $\lambda 2$ and $\lambda 3$ are incident with almost the same degree of divergence.

The objective optical element written in item 18 is the structure written in any one of items 14-17, wherein when f11 is a focal length of the first optical element for the wavelength $\lambda 1$, f12 is a focal length of the second optical element for the wavelength $\lambda 1$, $$|f12/f11|<0.1 \text{ and } |1/f11|<0.02 \tag{8}$$

is satisfied. When the power of the first optical element is decreased, the attaching error between 2 optical elements can be suppressed, and thereby, the assembling becomes comparatively simple.

The objective optical element written in item 19 is the structure written in any one of items 14-18, wherein at least one surface of the first optical element has a paraxial curvature radius which is almost infinity. When the power of the first optical element is decreased, the attaching error between 2 optical elements can be suppressed, and thereby, the assembling becomes comparatively simple.

In the present invention, "almost infinity" indicates a case when a curvature radius of the optical element on the optical axis is not less than 200 mm, preferably not less than 500 mm, and more preferably is flat surface.

The objective optical element written in item 20 is the structure written in any one of items 1-19, wherein the objective optical element is provided with the third optical path difference providing structure, and the third optical path difference providing structure includes a plurality of ring-shaped zones whose centers are on an optical axis and has a serrated cross sectional shape along an optical axis, wherein when the light flux with the wavelength $\lambda 1$ passes through the ring-shaped zones, the third optical path difference providing structure provides P times as much as optical path difference of the wavelength $\lambda 1$, when the light flux with the wavelength $\lambda 2$ passes through the ring-shaped zones, the third optical path difference providing structure provides Q times as much as optical path difference of the wavelength $\lambda 2$, a combination of P and Q satisfies P=5 and Q=2; P=8 and Q=5; or P=10 and Q=6, where P and Q are natural numbers.

In the present invention, "P times" and "Q times" do not indicates only the exact value, but it also includes a value in a range from ±0.12 from the value.

The third optical-path difference providing structure is provided for decreasing the aberration generation due to the wavelength variation of several nm, which can be generated by the first, second optical path difference providing structures. Herein, when the light vertically enters on the optical surface, the refraction of the light of the wavelength $\lambda 1$, $\lambda 2$ passing the diffractive structure are expressed by the difference of the following expressions (6), (7).

$$-n1 \times \sin \theta 1 = \lambda 1/p \tag{6}$$

$$-n2 \times \sin \theta 2 = (Q/P) \times \lambda 2/p \tag{7}$$

Where, n1 and n2 are refractive indexes of the optical element in respective wavelengths $\lambda 1$ and $\lambda 2$, $\theta 1$ and $\theta 2$ are outgoing angles of respective wavelengths $\lambda 1$ and $\lambda 2$, P and Q are diffraction order of respective wavelengths $\lambda 1$ and $\lambda 2$, P is pitch of diffractive ring-shaped zone.

Because wavelength change >> refractive index change, the bending (outgoing angle) by the diffractive structure depends on the change of wavelength, and in the objective lens provided with the diffractive structure, the aberration correction can be conducted by using the wavelength difference. For example, in the case where $\lambda 1=405$ nm and $\lambda 2=655$ nm, a combination of P=1, Q=1 makes the difference between $\lambda 1$ and $(Q/P) \times \lambda 2$, 250 nm, however, a combination of P=5, Q=3 makes it −12 nm, a combination of P=8, Q=5 makes it 4 nm, and a combination of P=10, Q=6 makes it −12 nm. In these combinations, the diffractive action between wavelengths $\lambda 1$ and $\lambda 2$ becomes equal, and the objective lens can be operated as there is almost no mutual diffractive action. By using this, the correction of wavelength variation of about several nm in each wavelength can be conducted. When the diffraction order is other than this, there is also sometimes a case where the aimed correction is difficult.

The objective optical element written in item 21 is the structure written in item 20, when the first optical path difference providing structure satisfies the first optical path difference function $\Phi_i(h)$, where $$\Phi_i(h) = (A_2 \times h^2 + A_4 \times h^4 + \ldots + A_{2i} \times h^{2i}) \times \lambda \times M$$

where h is a height from the optical axis, $A_{2i}$ is a coefficient of the optical path difference function, i is a natural number, and $\lambda$ is a blaze wavelength, the third optical path difference providing structure satisfies the second optical path difference function $\Phi(h)$, $$\phi(h) = (B_2 \times h^2 + B_4 \times h^4 + \ldots + B_{2i} \times h^{2i}) \times \lambda \times P$$

where h is a height from the optical axis, $B_{2i}$ is a coefficient of the optical path difference function, i is a natural number, and $\lambda$ is a blaze wavelength, a sign of $\phi_1(\text{hmax})$ in which $A_2=0$ is substituted for a coefficient of the first optical path difference function is different from a sign of $\phi(\text{hmax})$ in which $B_2=0$ is substituted for a coefficient of second optical path difference function, where hmax is a height along an optical axis and a numerical aperture of the first optical information recording medium.

The objective optical element written in item 22 is the structure written in item 21, wherein the coefficient $A_2$ of the first optical path difference providing structure is not zero.

The objective optical element written in item 23 is the structure written in item 21 or 22, wherein the coefficient $B_2$ of the second optical path difference providing structure is not zero.

The objective optical element written in item 24 is the structure written in any one of items 1-23, wherein a distance along the optical axis between a focal position of a N-th order diffracted light flux for information recording and/or reproducing and a focal position of a (N±1)-th order diffracted light flux for information recording and/or reproducing is 0.01 mm or more.

The objective optical element written in item 25 is the structure written in any one of items 1-24, wherein at least one optical surface of the objective optical element has an aperture limit function corresponding to a wavelength of a light flux passing through the objective optical element.

The objective optical element written in item 26 is the structure written in item 25, wherein the aperture limit function is a dichroic filter transmitting a light flux with a predetermined wavelength.

The objective optical element written in item 27 is the structure written in item 25, wherein the aperture limit function makes a light flux with a predetermined wavelength into flare light using the diffractive structure.

The objective optical element written in item 28 is the structure written in item 27, wherein at least one optical surface of the objective optical element comprises at least two areas of a central area which includes the optical axis and has a concentric circle shape whose center is on the optical axis, and a peripheral area arranged around the central area and having the diffractive structure which makes the light flux with the predetermined wavelength into flare light, and the peripheral area makes a light flux with a wavelength $\lambda 3$ passing through the peripheral area into flare light.

The objective optical element written in item 29 is the structure written in item 28, wherein at least one optical surface of the objective optical element includes an outer peripheral area arranged in periphery of the peripheral area which includes the optical axis and has a concentric circle shape whose center is on the optical axis, and makes a light flux with a wavelength $\lambda 1$ or $\lambda 2$ passing through the outer peripheral area into flare light.

In the present specification, "flare light" is a light flux which is formed not to contribute to formation of a spot which is necessary for recording or reproducing on a prescribed information recording surface and passes outside of a prescribed numerical aperture. For example, in the case of recording or reproducing for CD, the flare light generates wavefront aberration of 0.07 $\lambda$rms (in this case, $\lambda$ is a wavelength in using CD) or more for the incident light flux corresponding to the higher numerical aperture than the numerical aperture from 0 to 0.43 or 0.45 which is necessary for recording or reproducing of the CD. "make to flare light" means to provide an incident light flux a property so as to make the incident light flux into a light flux with the above described aberration when the incident light irradiates onto the information recording surface.

The objective optical element written in item 30 is the structure written in item 28 or 29, wherein the central area comprises the first optical path difference providing structure.

The objective optical apparatus written in item 31 includes the objective optical element written in any one of items 1-30.

In the present specification, the objective optical element indicates, in a narrow sense, an optical element having a light converging action arranged in opposite to the optical information recording medium at the position of most optical information recording medium side under the condition that the optical information recording medium is loaded in the optical pickup apparatus, and in the broad sense, an optical element which can actuate at least in the optical axis direction by the actuator together with the optical element.

In the present specification, the first optical information recording medium includes, for example, optical disks standardized that information is recorded and/or reproduced on the disks by the objective optical element of NA 0.65 to 0.67 and the thickness of the protective layer is about 0.6 mm (for example, HD DVD), and also includes the optical disks standardized that information recorded and/or reproduced on the disks by the objective optical element of NA 0.85 and the thickness of the protective layer is about 0.1 mm (for example, Blu-ray Disc, BD). The second optical information recording medium includes optical disks of each kind of DVD series such as DVD-RAM, DVD-R, DVD-RW, used for both reproducing/recording, other than DVD-ROM, DVD-Video, used exclusively for the reproducing. Further, the third optical information recording medium indicates optical disks of CD series such as CD-R, CD-RW. Hereupon, in the present specification, when a phrase of "the thickness of the protective layer" is used, it includes also the thickness 0 mm.

According to the present invention, an objective optical element by which the fine spherical aberration correction can be conducted, even when the light fluxes of 3 different wavelengths are incident, can be provided.

Referring to the drawing, embodiments of the present invention will be described below. FIG. 1 is a view schematically showing the structure of the first optical pickup apparatus PU by which the recording and/or reproducing of the information can be adequately conducted also on any one of the high density optical disk HD (the first optical disk), DVD (the second optical disk) and CD (the third optical disk). The optical specification of the high density optical disk HD is: the first wavelength $\lambda 1=407$ nm, the thickness t1 of the first protective layer PL1 t1=0.6 mm, numerical aperture NA1=0.65; the optical specification of DVD is: the second wavelength $\lambda 2=655$ nm, the thickness t2 of the second protective layer PL2 t2=0.6 mm, numerical aperture NA2=0.65; and the optical specification of CD is: the third wavelength $\lambda 3=785$ nm, the thickness t3 of the third protective layer PL3 t3=1.2 mm, numerical aperture NA3=0.51.

The optical pickup apparatus PU is generally structured by: a laser unit 2L1P in which a blue-violet semiconductor laser LD1 (the first light source) which is light emitted when the recording and/or reproducing of the information is conducted on the high density optical disk HD and which projects a laser light flux (the first light flux) of 408 nm, the red semiconductor laser (the second light source) which is light emitted when the recording and/or reproducing of the information is conducted on DVD and which projects a laser light flux (the second light flux) of 658 nm, and the infrared semiconductor laser (the third light source) which is light emitted when the recording/reproducing of the information is conducted on CD and which projects a laser light flux (the third light flux) of 785 nm, are housed in one package; the first light detector PD1 which light receives the reflected light flux from the information recording surface RL1 of the high density optical disk HD; the second light detector PD2 which light receives the reflected light fluxes from the information recording surface RL2 of DVD, and the information recording surface RL3 of CD; the objective optical element OBJ composed of the aberration correction element L1 (the first optical element) and the light converging element L2 both surfaces of which are aspheric surfaces, having a function by which the laser light fluxes transmitted this aberration correction element L1 are light converged on the information recording surfaces RL1, RL2, RL3; 2-axis actuator AC1; a stop STO corresponding to the numerical aperture NA1 of the high density optical disk HD; the first-the fourth polarizing beam splitters BS1-BS4; the first-the third collimator lenses COL1-COL3; the first sensor lens SEN1; and the second sensor lens SEN2.

In the optical pickup apparatus PU, when the recording and/or reproducing of the information is conducted on the high density optical disk HD, as its light path is drawn by a solid line in FIG. 1, the blue-violet semiconductor laser LD1 is light emitted. The divergent light flux projected from the blue-violet semiconductor laser LD1 transmits the first polarizing beam splitter BS1 after it is converted into the parallel light flux by the first collimator lens COL1, and after it transmits the second polarizing beam splitter BS2, the light flux diameter is regulated by the stop STO, and becomes a spot formed on the information recording surface RL1 through the first protective layer PL1 by the objective optical element OBJ. Hereupon, an action given by the objective optical element OBJ to the light flux of the wavelength λ1 will be described later. The objective optical element OBJ conducts the focusing or tracking by the 2-axis actuator AC1 arranged in its periphery.

After the reflected light flux modulated by the information pit on the information recording surface RL1, transmits again the objective optical element OBJ, the second polarizing beam splitter BS2, and reflected by the first polarizing beam splitter BS1, and the astigmatism is given by the sensor lens SEN1, it is converted into the converging light flux by the third collimator lens COL3, and converged on the light receiving surface of the first light detector PD1. Then, by using the output signal of the first light detector PD1, the information recorded in the high density optical disk HD can be read.

Further, when the recording and/or reproducing of the information is conducted on DVD, initially, the second light source of the laser unit 2L1P is light emitted. The divergent light flux projected from the laser unit 2L1P passes, as its light path is drawn by a dotted line in FIG. 1, the third polarizing beam splitter, the fourth beam splitter, and after it is made into the parallel light flux by the second collimator lens COL2, reflected by the second polarizing beam splitter BS2, and becomes a spot formed on the information recording surface RL2 through the second protective layer PL2 by the objective optical element OBJ. Hereupon, the action given to the light flux of the wavelength λ2 by the objective optical element OBJ will be described later. The objective optical element OBJ conducts the focusing or tracking by the 2-axis actuator AC1 arranged in its periphery. The reflected light flux modulated by the information pit on the information recording surface RL2, passes again the objective optical element OBJ, reflected by the second polarizing beam splitter BS2, and converted into the converging light flux by the second collimator lens COL2, reflected by the fourth polarizing beam splitter BS4, and the astigmatism is given by the second sensor lens SEN2, and it is converged on the light receiving surface of the second light detector PD2. Then, by using the output signal of the second light detector PD2, the information recorded in DVD can be read.

Further, when the recording and/or reproducing of the information is conducted on CD, the third light source of the laser unit 2L1P is light emitted. The divergent light flux projected from the laser unit 2L1P passes, although it is not drawn, the third polarizing beam splitter, the fourth polarizing beam splitter, and after it is made into the parallel light flux by the second collimator lens COL2, reflected by the second polarizing beam splitter BS2, and becomes a spot formed on the information recording surface RL3 through the third protective layer PL3 by the objective optical element OBJ. Hereupon, the action given to the light flux of the wavelength λ3 by the objective optical element OBJ will be described later. The objective optical element OBJ conducts the focusing or tracking by the 2-axis actuator AC1 arranged in its periphery. The reflected light flux modulated by the information pit on the information recording surface RL3, passes again the objective optical element OBJ, reflected by the second polarizing beam splitter BS2, and converted into the converging light flux by the second collimator lens COL2, reflected by the fourth polarizing beam splitter BS4, and the astigmatism is given by the second sensor lens SEN2, and the light flux is converged on the light receiving surface of the second light detector PD2. Then, by using the output signal of the second light detector PD2, the information recorded in CD can be read.

Figure 2:
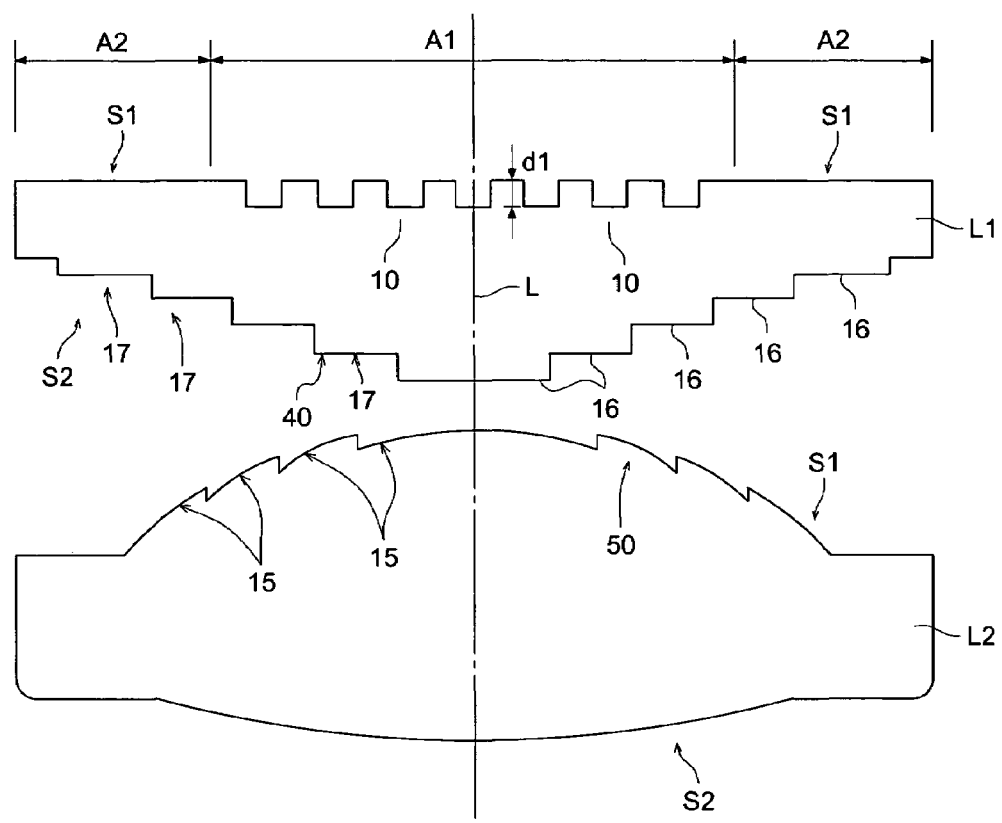
FIG. 2 is an outline sectional view of an objective optical element OBJ.

Next, the composition of the objective optical system OBJ will be described. FIG. 2 is an outline sectional view of the objective optical system OBJ, and the optical surface shape is exaggeratedly drawn. The objective optical system OBJ is composed of the aberration correction element L1 and the light converging element L2. Hereupon, although the illustration is neglected, in the periphery of respective optical function sections (areas of the aberration correction element L1 and the light converging element L2 which the first light flux passes), it has flange sections integrally molded with the optical function sections, and when mutual one portions of such flange sections are adhered, they are integrated. When the aberration correction element L1 and the light converging element L2 are integrated, both may also be integrated through a mirror frame, which is a separated member.

The optical surface S1 (incident surface) on the semiconductor laser light source side of the aberration correction element L1 is, as shown in FIG. 2, is divided into the first area (central area) A1 which is concentric circular around the optical axis L corresponding to an area in NA3, and includes the optical axis L, and the second area (peripheral area) A2 which is concentric circular, formed in the area outer the first area A1. Then, the first diffractive structure 10 as the first optical path difference providing structure is formed in the first area A1.

The first diffractive structure 10 is formed of a plurality of grooves (discontinuous portion) 11 which are concentric circular around the optical axis and are the same depth d1, and the second diffractive structure 20 is formed of the structure which has inside the step structure formed of a predetermined number of step portions 21 and the discontinuous portion 22, and in which the ring-shaped zone 23, which is concentric circular around the optical axis, is periodically formed.

Figure 3:
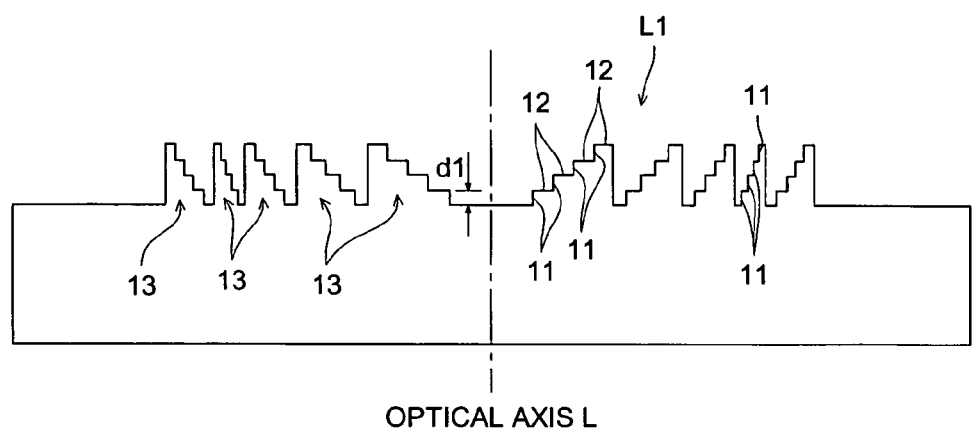
FIGS. 3(a) and 3(b) are an outline sectional views showing a modified example of the objective optical element OBJ.
Figure 3:
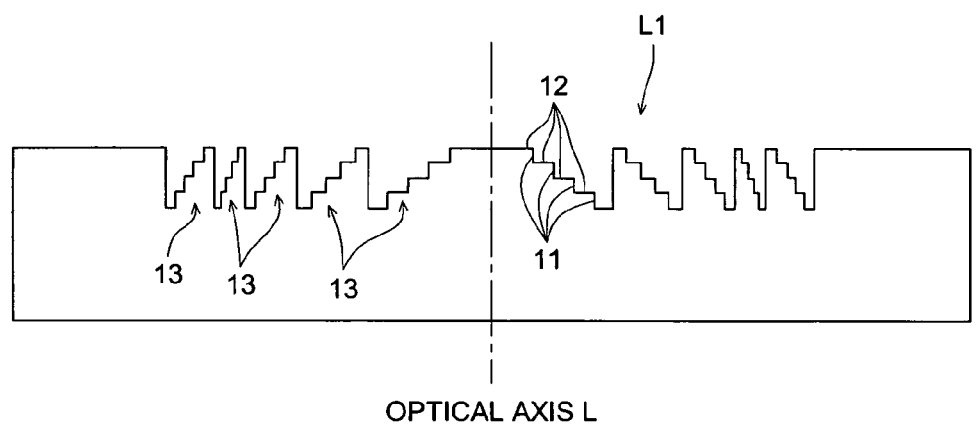

As the first diffractive structure 10, other than the structure shown in FIG. 2, for example, the step-shaped structure as typically shown in FIG. 3 may also be allowable.

The first diffractive structure 10 is set in such a manner that it practically gives the phase difference only to the light flux of wavelength λ3 in the light fluxes of the wavelength λ1, wavelength λ2 and wavelength λ3, and to the light fluxes of wavelengths λ1 and λ2, does not practically give the phase difference. Because the diffractive action is received when the phase difference is practically given to the light flux of wavelength λ3, in the diffracted lights of wavelength λ3 generated hereby, the diffracted light having the highest diffraction efficiency can be used for the recording and/or reproducing of the information of CD.

Specifically, when the refractive index for the light flux of wavelength λ1 of the aberration correction element L1 in which the first diffractive structure 10 is formed is n1, the step difference amount in the optical axis direction of the groove 11 in the first diffractive structure 10 is d1, the number of the discontinuous portions is m1 (integer), and $d=\lambda1/(n1-1)$, the first diffractive structure 10 is designed in such a manner that it satisfies $$4.7 \times d \leq d1 \leq 5.3 \times d \quad (1)$$

$$2 < m1 \leq 5 \quad (2).$$

Hereby, the step difference d1 of the first diffractive structure 10 is set to the depth of about integer-times of wavelength λ1. When the light flux of wavelength λ1 is incident on the groove structure in which the depth of the step difference d1 is set in this manner, because the optical path difference of about integer-times of λ1 is generated between adjoining step differences, and the phase difference is not practically given to the light flux of wavelength λ1, the incident light flux of wavelength λ1 is not diffracted in the first diffractive structure 10 and passes as it is. Further, when, on this diffractive structure, the light flux of wavelength λ2 is incident, the phase difference is not practically given to the light flux, and in the same manner, the light flux passes as it is.

On the one hand, because, for the incident light flux of wavelength λ3, the phase difference corresponding to the depth of groove and the number of discontinuous portions is generated, by using the diffractive action, for example, by using the diffracted light of wavelength λ3 having high diffraction efficiency, the recording/reproducing of the information can be conducted on CD, and the correction of the chromatic aberration of CD or the correction of the spherical aberration following the temperature change can be conducted.

Further, for the recording/reproducing of the information for CD, because only the light flux which passes the first area A1 in the light fluxes of wavelength λ3 is used, the light flux of wavelength λ3 which passes the second area A2 becomes unnecessary light. Accordingly, the diffractive action is given to the light flux of wavelength λ3 by the diffractive structure formed in the second area A2 so that the light flux of wavelength λ3 which passed the second area A2 is not light-converged on the information recording surface RL3 of CD, and in the different-order diffracted light generated hereby, the diffracted light having comparatively high diffraction efficiency (for example, not smaller than 30%) can also be made into a flare light. Hereby, the aperture limit function for NA3 can be given to the objective optical element OBJ, and by such a diffractive structure, the longitudinal spherical aberration of the light flux of wavelength λ3 can be made discontinuous over the first area A1 to the second area A2, and the detection accuracy of the reflected-light of the light flux of wavelength λ3 in the second light detector PD2 can be improved.

Hereupon, there is a case where a plurality of diffracted light (for example, +1-order and −1-order diffracted light) of wavelength λ3 have about the same diffraction efficiency (for example, about 40%), however, in such a case, all of the plurality of diffracted light, whose diffraction efficiency is high, or the diffracted light having the possibility that is light-converged on the information recording surface RL3 of CD, are made into a flare light.

On the one hand, the third optical path difference providing structure 40 is formed on the optical surface S2 (outgoing surface) on the optical disk side of the aberration correction element L1. The third optical path difference providing structure 40 is structured by, as shown in FIG. 2, a plurality of ring-shaped zones 17 in which the direction of step difference 16 is the same in the effective diameter, and the shape of the cross section including the optical axis L is a step-shape, and the structure 40 is structured in such a manner that the phase difference is not practically given to the incident light fluxes of the wavelength λ1 and wavelength λ2.

Specifically, the third optical path difference providing structure 40 is set in such a manner that the optical path difference of P-times of wavelength λ1 is given to the light flux when the incident light flux of wavelength λ1 passes each ring-shaped zone 17, and the optical path difference of Q-times of wavelength λ2 is given to the light flux when the incident light flux of wavelength λ2 passes each ring-shaped zone, and when the optical path difference function φ(h) is used, the structure 40 is designed in such a manner that it is regulated by $\phi(h)=(B_2 \times h^2 + B_4 \times h^4 + \ldots + B_{2i} \times h^{2i}) \times \lambda \times P$, and when the coefficient $B_2=0$ is substituted, it becomes φ(hmax) >0.

Herein, h is the height from the optical axis, $B_{2i}$ is a coefficient of the optical path difference function, i=natural number, λ is a blaze wavelength, hmax is the height from the optical axis L which is a numerical aperture NA1 of the high density optical disk HD.

As a combination of P and Q, it is any one of (P, Q)=(5, 3), (8, 5), (10, 6).

Hereupon, in the case where, by using the first optical path difference function $\phi_1(h)$, $\phi_1(h)$ is expressed as $\phi_1(h)=(A_2 \times h^2+A_4 \times h^4 + \ldots + A_{2i} \times h_{2i}) \times \lambda \times M$ (h: the height from the optical axis, $A_{2i}$: a coefficient of the optical path difference function, i: natural number, λ: blaze wavelength), when the height from the optical axis which is the numeral aperture on the high density optical disk HD side is made hmax, a sign of $\phi_2$(hmax) obtained when $A_2=0$ is substituted and a sign of φ(hmax) obtained when $B_2=0$ is substituted, are different.

When light fluxes of the wavelength λ1 and wavelength λ2 are vertically incident on the optical surface (in the present embodiment, outgoing surface S2) on which the second optical path difference providing structure 40 is formed, the difference of incident angles of the light by the diffractive structure of light fluxes of the wavelengths λ1 and λ2 is expressed by the difference between the following expressions (6), (7).

$$-n1 \times \sin\theta 1 = P \times \lambda 1/p \tag{6}$$

$$-n2 \times \sin\theta 2 = Q \times \lambda 2/p \tag{7}$$

Where, n1, n2: refractive index of the aberration correction element L1 at wavelengths λ1, λ2; θ1, θ2: outgoing angle of wavelengths λ1, λ2; p: pitch of diffractive ring-shaped zone.

Generally, it is well known that, in the influence exerted on the refractive power of the optical element, the influence due to the wavelength change is larger than the influence due to the change of refractive index of the optical element itself. In the present embodiment, the bending (outgoing angle) by the third optical path difference providing structure 40 depends on the wavelength change of the wavelength λ1 and wavelength λ2.

For example, when the wavelength λ1=405 nm and λ2=655 nm, and (P, Q)=(1, 1), the difference between λ1 and (Q/P)×λ2 is 250 nm, and the difference between outgoing angles of each light flux by the diffractive action becomes large. However, when (P, Q)=(5, 3), it is −12 nm, when (P, Q)=(8, 5), it is 4 nm, and when (P, Q)=(10, 6), it is −12 nm, that is, the difference becomes small. Accordingly, when any one of combinations of (P, Q)=(5, 3), (8, 5), (10, 6) is applied, the outgoing angle of each light flux by the diffractive action is almost equal, and it can be treated on the assumption that there is practically almost no mutual diffractive action. Accordingly, as described above, when the third optical path difference providing structure is designed so as to be φ(hmax) >0, and the wavelength variation of about several nm is generated in the light fluxes of wavelength λ1 and wavelength λ2, the aberration generated by the second diffractive structure 50 which is the second optical path difference providing structure, and the first diffractive structure 10 can be decreased by the second optical path difference providing structure 40.

The second diffractive structure 50 is formed, as shown in FIG. 2, on the optical surface S1 (incident surface) on the semiconductor laser light source side of the light converging element L2. The second diffractive structure 50 is structured by a plurality of ring-shaped zones 15 and the sectional shape including the optical axis is a serrated shape.

Each of light fluxes of wavelengths λ1, λ2 and λ3 which pass the aberration correction element L1 is received the diffractive action by the second diffractive structure 50, and after L-th order diffracted light (L is even number) of the light flux of wavelength λ1 generated hereby, is received the refractive action on the outgoing surface S2 of the light converging element L2, the diffracted light forms the light converged spot on the information recording surface RL1 of the high density optical disk HD. M-th order diffracted light (M is integer) of the light flux of the wavelength λ2 forms the light-converged spot on the information recording surface RL2 of DVD after the diffracted light receives the refractive action on the outgoing surface of the light converging element L2. N-th order diffracted light (N is integer) of the light flux of the wavelength λ3 forms the light converged spot on the information recording surface RL3 of CD after the diffracted light receives the refractive action on the outgoing surface of the light converging element L2.

In other words, the second diffractive structure 50 is designed so as to conduct the aberration correction so that L-th order diffracted light of the light flux of the wavelength λ1 forms a good spot on the information recording surface RL1 of the high density optical disk HD. The structure 50 is designed so as to conduct the aberration correction so that M-th order diffracted light of the light flux of the wavelength λ2 forms a good spot on the information recording surface RL2 of DVD by the phase difference given when the diffracted light passes the first diffractive structure 10. Further, the structure 50 is designed so as to conduct the aberration correction so that N-th order diffracted light of the light flux of the wavelength λ3 forms a good spot on the information recording surface RL3 of CD.

That is when the diffraction order in which the diffraction efficiency of the wavelength λ1 is maximum, is made into an even number, both of light fluxes of wavelengths λ1 and λ3 passing the second diffractive structure 50 have high diffraction efficiency. On the one hand, in the first diffractive structure 10, when the wavelength difference which is not integer-times is given only to the wavelength λ3 (to other 2 wavelengths, the wavelength difference of integer-times is given), and the light flux of wavelength λ3 passes the first diffractive structure, the aberration correction of the light flux of the wavelength which is under-correction, can be conducted. As a combination of such L, M and N, (L, M, N)=(2, 2, 1), (6, 4, 3), (8, 5, 4), (10, 6, 5) is listed.

Further, when the diffraction efficiencies of the L-th order, M-th order and N-th order diffracted light are respectively η1, η2 and η3, for the purpose to attain the compatibility among the high density optical disk, DVD and CD, it is preferable that they have diffraction efficiencies to satisfy η1>80%, η2>70% and η3>80%.

Hereupon, in the present embodiment, the objective optical element OBJ is 2-group composition composed of the aberration correction element L1 and the light converging element L2. Hereby, the diffraction power or refraction power can be distributed to 2 optical elements, and there is an advantage that the degree of freedom of the design work is improved, however, it is not limited to this, the objective optical element OBJ is composed of a single lens, and the optical path difference providing structure or diffractive structure may also be provided on the incident surface and outgoing surface of this lens.

Further, the second diffractive structure 50 and the first diffractive structure 10 may also be provided in the aberration correction element L1, and in this case, because the light converging element L2 can be formed of a glass lens, the generation of the aberration due to the temperature change can be suppressed.

Further, as in the present embodiment, it is preferable that the first diffractive structure 10 is provided on the incident surface S1 of the aberration correction element L1. It is for the reason that it is desirable that the first diffractive structure 10 is provided on the surface on which each light flux is incident as the parallel light, for the purpose to prevent a possibility that, when the first diffractive structure 10 is formed of step portions perpendicular to the optical axis, as compared to the serrated structure, the step difference amount in the optical axis L direction becomes large, and the eclipse by the oblique incidence of the light flux is generated, and the diffraction efficiency is lowered.

Further, when the focal distance of the aberration correction element L1 is f11, and the focal distance of the light converging element L2 is f12, it is preferable to conduct the lens design so as to satisfy |1/f12/f11|<0.1, and |1/f11|<0.02, or so that the paraxial radius of curvature of at least one surface of the aberration correction element L1 becomes almost infinite. When the refractive power of the aberration correction element L1 is weakened in this manner, the assembling error of the aberration correction element L1 and the light converging element L2 can be suppressed. Further, because the shape of the optical surface becomes almost flat surface, the first diffractive structure 10 or the second diffractive structure 50 is easily formed on the optical surface.

Further, it is preferable that, when the reproducing and/or recording of the information is conducted on CD, the focal position of N-th order diffracted light and the focal position of (N±1)-order diffracted light are separated in the optical axis L direction by not smaller than 0.01 mm.

Further, by attaching the dichroic filter or the liquid crystal phase control element to the optical element composing the objective optical element OBJ, the aperture limit function may also be given to the objective optical element. Moreover, the aperture limit function may also be given to the objective optical element by arranging a diffractive structure which makes a light flux with a predefined wavelength into flare light. For example, at least one surface of the objective optical element OBJ may be provided with a central area, peripheral area and outer peripheral area. The central area which includes the optical axis and has a concentric circle shape whose center is on the optical axis, the peripheral area arranged around the central area and having the diffractive structure which makes the light flux with the predetermined wavelength into flare light, and the outer peripheral area arranged in periphery of the peripheral area which includes the optical axis and has a concentric circle shape whose center is on the optical axis. The peripheral area makes a light flux with a wavelength λ3 passing through the peripheral area into flare light. The outer peripheral area makes a light flux with a wavelength λ1 or λ2 passing through the outer peripheral area into flare light. Hereupon, although illustration is neglected, when the optical pickup apparatus. PU shown in the above embodiment, the rotation drive apparatus which rotatably holds the optical disk, and the control apparatus for controlling the drive of each of these kinds of apparatus are mounted, the optical information recording reproducing apparatus by which at least one of the recording of the optical information in the optical disk and the reproducing of the information recorded in the optical disk can be conducted, can be obtained.

EXAMPLE 1

Next, examples will be described. In the present example, as shown in FIG. 2, the objective optical element OBJ is composed of the aberration correction element L1 and the light converging element L2. The incident surface S1 (the 3rd surface) of the aberration correction element is a plane, and the outgoing surface S2 (4th surface) is formed of an aspheric surface, and the incident surface S1 (the 4th surface) and the outgoing surface S2 (the 5th surface) of the light converging element L2 are formed of aspheric surface.

The first diffractive structure 10 (first phase difference providing structure) is formed on the incident surface S1 of the aberration correction element L1, and the third optical path difference providing structure is formed on the emerging surface S2 of the aberration correction element L1. The second diffractive structure 50 (second phase difference providing structure) whose sectional shape including the optical axis is serrated shape is formed on the incident surface S1 of the light converging element L2. Lens data is shown in Table 1. In Table 1, Ri expresses radius of curvature, di is a position in the optical axis direction from i-th surface to (i+1)-th surface, ni expresses a refractive index of each surface. Hereupon, hereinafter (including the lens data of Table), the exponent (for example, $2.5 \times 10^{-3}$) of 10 is expressed by using E (for example, 2.5×E−3).

TABLE 1

Example 1
Focal distance: $f_1$ = 3.00 mm, $f_2$ = 3.10 mm, $f_3$ = 3.12 mm,
f11 = ∞, f12 = 3.00 mm
Numerical aperture: NA1 = 0.65, NA2 = 0.65, NA3 = 0.51
Image forming magnification: m = 0.0, m = 0.0, m = 0.0

| i-th surface | Ri | di (407 nm) | ni (407 nm) | di (655 nm) | ni (655 nm) | di (785 nm) | ni (785 nm) | note |
|---|---|---|---|---|---|---|---|---|
| 0 |  | ∞ |  | ∞ |  | ∞ |  |  |
| 1 | ∞ | 0.00 | 1.0 | 0.00 | 1.0 | 0.00 | 1.0 | stop |
| 2 | ∞ | 1.00 | 1.55981 | 1.00 | 1.54073 | 1.00 | 1.53724 | *1 |
| 3 | ∞ | 0.10 | 1.0 | 0.10 | 1.0 | 0.10 | 1.0 | *2 |
| 4 | 1.93657 | 1.73 | 1.55981 | 1.73 | 1.54073 | 1.73 | 1.53724 | *2 |
| 5 | −13.55104 | 1.735 | 1.0 | 1.79694 | 1.0 | 1.32516 | 1.0 | *3 |
| 6 | ∞ | 0.6 | 1.61869 | 0.6 | 1.577521 | 1.2 | 1.57063 |  |
| 7 | ∞ |  |  |  |  |  |  |  |

*di expresses a dislocation from the i-th surface to the (i + 1)-th surface.
*1: diffraction surface
*2: Aspheric surface · diffraction surface
*3: Aspheric surface Aspheric surface · diffraction surface data

| | | | | | |
|---|---|---|---|---|---|
| $2^{nd}$ surface | 0 ≦ h ≦ 1.591 *1<br>1.591 ≦ h    *2 | | Optical path difference function Coefficients | | Step shape: |
| | | B2 | 0.0000E+00 | | M1 = 2 |
| | | B4 | −4.9055E−01 | | d1 = 5 |
| | | B6 | −4.6675E−02 | | *3 |
| $3^{rd}$ surface | Aspheric surface coefficient | | Coefficients of optical path difference function | | Serrated shape: Diffraction order |
| | κ | 0.0000E+00 | B2 | 0.0000E+00 | P = 10 |
| | A4 | −7.6977E−04 | B4 | 1.0657E+00 | Q = 6 |
| | A6 | −3.5905E−04 | B6 | 4.9116E−01 | R = 5 |
| $4^{th}$ surface | Aspheric surface coefficient | | Coefficients of optical path difference function | | Serrated shape: Diffraction order |
| | κ | −5.5809E−01 | B2 | −2.0853E+01 | L = 8 |
| | A4 | −3.4712E−04 | B4 | −2.5680E+00 | M = 5 |
| | A6 | −1.7140E−04 | B6 | −3.0226E+00 | N = 4 |
| | A8 | 6.5850E−04 | B8 | 8.7789E−01 | |
| | A10 | −7.5544E−05 | B10 | −1.0763E−01 | |
| | A12 | −5.0776E−06 | | | |
| | A14 | −7.7798E−07 | | | |
| $5^{th}$ surface | Aspheric surface coefficient | | | | |
| | κ | −1.4950E+02 | | | |
| | A4 | 1.4232E−03 | | | |
| | A6 | 7.6710E−03 | | | |
| | A8 | −4.9896E−03 | | | |
| | A10 | 1.3886E−03 | | | |

TABLE 1-continued

Example 1
Focal distance: $f_1 = 3.00$ mm, $f_2 = 3.10$ mm, $f_3 = 3.12$ mm,
fl1 = ∞, fl2 = 3.00 mm
Numerical aperture: NA1 = 0.65, NA2 = 0.65, NA3 = 0.51
Image forming magnification: m = 0.0, m = 0.0, m = 0.0

| | |
|---|---|
| A12 | −1.9492E−04 |
| A14 | 1.11097E−05 |

Optical path difference function when hmax = 1.95:
$\phi_1$ (hmax) = 42.4, $\phi$ (hmax) = −105.3
*1: Diffraction surface *2: Refractive surface
*3: The phase difference is given only to λ3 and it is diffracted. The optical path difference of an amount of 5 wavelengths is generated in λ1, and the optical path difference of an amount of 3 wavelengths is generated in λ2, and because the phase difference is not almost generated, they are not diffracted.

Hereupon, the incident surface (the 4th surface) and the outgoing surface (the 5th surface) of the light converging element are respectively formed into aspheric surface which is axially symmetric around the optical axis, regulated by the equation in which coefficients shown in Table 1 are substituted in Math-1.

Aspheric surface shape equation (Math-1)

$$X(h) = \frac{(h^2/R)}{1 + \sqrt{1 - (1+\kappa)(h/R)^2}} + \sum_{i=1}^{9} A_{2i} h^{2i}$$

Herein, X(h) is an axis (the advancing direction of the light is positive) in the optical axis direction, κ is a conical coefficient, $A_{2i}$ is an aspheric surface coefficient, and h is the height from the optical axis.

Further, the optical path length given to the light flux of each wavelength by the first diffractive structure is regulated by the equation in which coefficients shown in Table 1 are substituted into the optical path difference function of Math-2.

Optical path difference function (Math-2)

$$\phi(h) = \sum_{i=1}^{5} B_{2i} h^{2i}$$

$B_{2i}$ is a coefficient of the optical path difference function.

When the optical path difference function of the first diffractive structure in Example 1 is a wavelength 410 nm and is blazed in $8^{th}$ order, an optical pickup apparatus with η1 of 92% (the $8^{th}$ order light beam), η2 of 86% (the 5th order light beam), and η3 of 94% (the 4th order light beam) can be designed.

Figure 5:
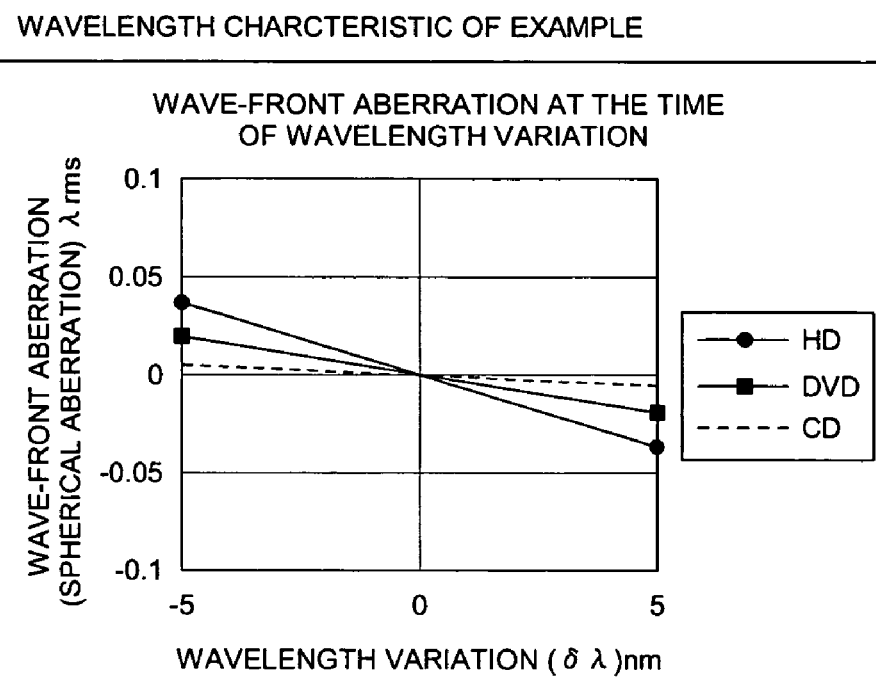
FIG. 5 is a view showing the wavefront aberration characteristic at the time of wavelength variation in Example 1.

FIGS. 4(a)-4(c) are longitudinal spherical aberration views of the light flux of wavelength λ1 (HD) in Example 1, the light flux of wavelength λ2 (DVD) and the light flux of wavelength λ3 (CD), and for the axis of ordinate, NA when the DVD aperture is 1, and for the axis of abscissa, SA (mm) are shown. Dotted line is a necessary numerical aperture in each optical disk. FIG. 5 is a view showing the wavefront aberration characteristic at the time of wavelength variation in Example 1.

COMPARATIVE EXAMPLE

Figure 6B:
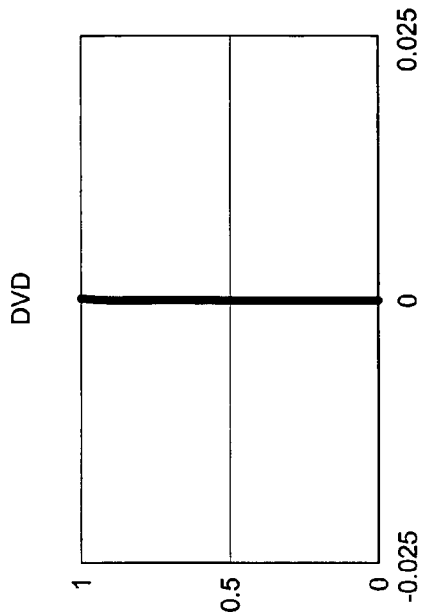
FIGS. 6(a)-6(c) are views of the longitudinal spherical aberration of the light flux (HD) of wavelength $\lambda 1$, the light flux (DVD) of wavelength $\lambda 2$ and the light flux (CD) of wavelength $\lambda 3$ in Comparative Example.
Figure 6C:
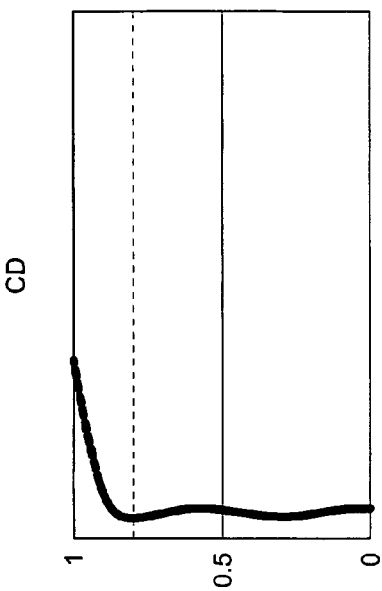
Figure 6A:
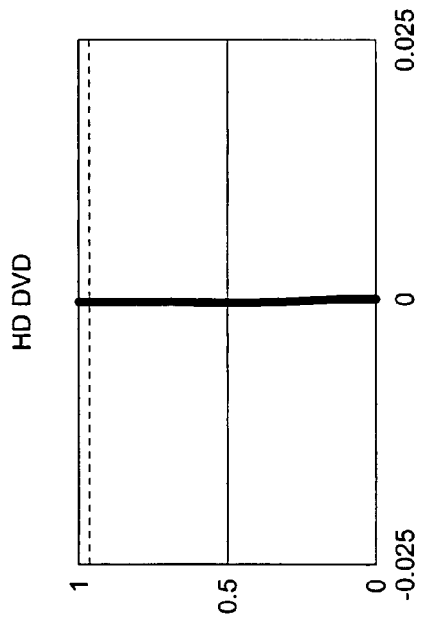
Figure 7:
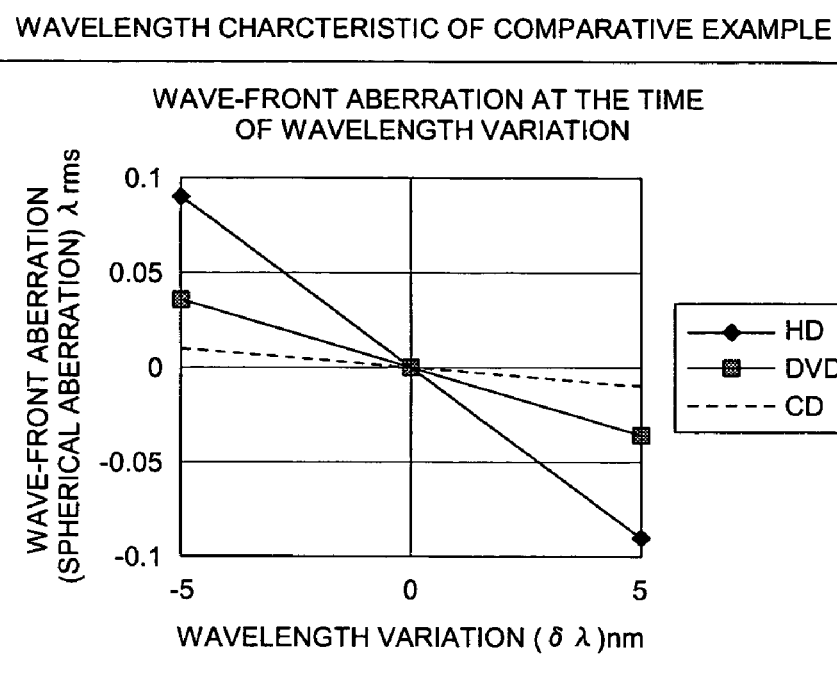
FIG. 7 is a view showing the wavefront aberration characteristic at the time of wavelength variation in Comparative Example.

Next, a comparative example will be described. The present comparative example is an example in which the spherical aberration is conducted by providing a single diffractive structure in one sheet of objective lens. The lens data is shown in Table 2, Ri is the radius of curvature, di is the position in the optical axis direction from the i-th surface to the (i±1)-th surface, ni expresses the refractive index of each surface. Hereupon, the aspheric surface shape and the optical path difference addition shape follow Math-1, Math-2. In FIGS. 6(a)-6(c), the longitudinal spherical aberration view is shown, and in FIG. 7, the wavefront aberration characteristic at the time of wavelength variation of the comparative example, is shown.

TABLE 2

Comparative example
Focal distance: $f_1 = 3.00$ mm, $f_2 = 3.10$ mm, $f_3 = 3.12$ mm,
fl1 = ∞, fl2 = 3.00 mm
Numerical aperture: NA1 = 0.65, NA2 = 0.65, NA3 = 0.51
Image forming magnification: m = 0.0, m = 0.0, m = −1/14.6

| i-th surface | Ri | di (407 nm) | ni (407 nm) | di (655 nm) | ni (655 nm) | di (785 nm) | ni (785 nm) | note |
|---|---|---|---|---|---|---|---|---|
| 0 | | ∞ | | ∞ | | 48.5352 | | |
| 1 | ∞ | 0.00 | 1.0 | 0.00 | 1.0 | 0.00 | 1.0 | *1 |
| 2 | 1.93657 | 1.73 | 1.55981 | 1.73 | 1.54073 | 1.73 | 1.53724 | *2 |

TABLE 2-continued

Comparative example
Focal distance: $f_1 = 3.00$ mm, $f_2 = 3.10$ mm, $f_3 = 3.12$ mm,
$fl1 = \infty$, $fl2 = 3.00$ mm
Numerical aperture: NA1 = 0.65, NA2 = 0.65, NA3 = 0.51
Image forming magnification: m = 0.0, m = 0.0, m = −1/14.6

| | | | | | | | | |
|---|---|---|---|---|---|---|---|---|
| 3 | −13.55104 | 0.735 | 1.0 | 1.79694 | 1.0 | 1.53820 | 1.0 | *3 |
| 4 | ∞ | 0.6 | 1.61869 | 0.6 | 1.577521 | 1.2 | 1.57063 | |
| 5 | ∞ | | | | | | | |

*di expresses a dislocation from the i-th surface to the (i + 1)-th surface.
*1: stop
*2: Aspheric surface · diffraction surface
*3: Aspheric surface Aspheric surface · diffraction surface data

| $2^{nd}$ Surface | | Aspheric surface coefficient | | Coefficients of optical path difference function | Serrated shape: Diffraction order |
|---|---|---|---|---|---|
| | K | −5.5809E−01 | B2 | −2.0853E+01 | L = 8 |
| | A4 | −3.4712E−04 | B4 | −2.5680E+00 | M = 5 |
| | A6 | −1.7140E−03 | B6 | −3.0226E+00 | N = 4 |
| | A8 | 6.5850E−04 | B8 | 8.7789E−01 | |
| | A10 | −7.5544E−05 | B10 | −1.0763E−01 | |
| | A12 | −5.0776E−06 | | | |
| | A14 | −7.7798E−07 | | | |
| $3^{rd}$ Surface | | Aspheric surface coefficient | | | |
| | K | −1.4950E+02 | | | |
| | A4 | 1.4232E−03 | | | |
| | A6 | 7.6710E−03 | | | |
| | A8 | −4.9896E−03 | | | |
| | A10 | 1.3886E−03 | | | |
| | A12 | −1.9492E−04 | | | |
| | A14 | 1.11097E−05 | | | |

Optical path difference function when hmax = 1.95:
$\phi_1$ (hmax) = 42.4, $\phi$ (hmax) = −105.3

When FIGS. 4(a)-4(c) and FIGS. 6(a)-6(c) are respectively compared, it is shown that, although example and Comparative example are aberration-corrected so that, in all light fluxes, the longitudinal spherical aberration sa is within ±0.005 mm in the necessary numerical aperture, the spherical aberration of CD of the comparative example is continuous, and any aperture limit is necessary, however, the spherical aberration of CD of example is discontinuous, and the aperture limit is necessary.

Hereupon, the optical surface to correct the spherical aberration generated by the change of wavelength of several nm-several tens nm caused by the diffractive structure, can be provided at need.

What is claimed is:

1. An objective optical element for use in an optical pickup apparatus including
    a first light source emitting a first light flux with a first wavelength λ1 for recording and/or reproducing information on an information recording surface of a first optical information recording medium having a protective layer with a thickness t1,
    a second light source emitting a second light flux with a second wavelength λ2 (λ1 <λ2) for recording and/or reproducing information on an information recording surface of a second optical information recording medium having a protective layer with a thickness t2 (t1≦t2),
    a third light source emitting a third light flux with a third wavelength λ3 (λ2 <λ3) for recording and/or reproducing information on an information recording surface of a third optical information recording medium having a protective layer with a thickness t3 (t2 <t3), and
    a light converging optical system including an objective optical element, the objective optical element comprising:
        a first optical path difference providing structure for providing an optical path difference which provides a substantial phase change to the third light flux and does not provide a substantial phase change to the first and second light fluxes; and
        a second optical path difference providing structure for providing an optical path difference to the first light flux, the second light flux and the third light flux,
    wherein the objective optical element converges the first - third light fluxes through the protective layers with the thicknesses t1-t3 onto an information recording surface of the first - third optical information media respectively, and
    wherein the second optical path difference providing structure has a serrated cross sectional shape and generates a L-th order diffracted light flux for being formed into a converged spot on the first optical information recording medium, a M-th order diffracted light flux for being formed into a converged spot on the second optical information recording medium, a N-th order diffracted light flux for being formed into a converged spot on the third optical information recording medium, where N is an integer number, L is 2N, and M is an integer number.

2. The objective optical element of claim 1, wherein when the optical pickup apparatus reproduces and/or records information on the first optical information recording medium, the second optical information recording medium and the third optical information recording medium, image forming magnifications of the objective optical element for the first third information recording media are almost the same as each other.

3. The objective optical element of claim 2, wherein each of the image forming magnifications of the objective optical element is 0.

4. The objective optical element of claim 1, wherein the first optical path difference providing structure is a diffractive structure.

5. The objective optical element of claim 1, wherein
the first optical path difference providing structure comprises a predetermined number of discontinuous portions formed periodically,
each of the discontinuous portions includes a groove and is formed in a concentric-circle shape whose center is on an optical axis, and
a step depth of the groove is regulated so as not to provide a substantial phase change to the first light flux passing through the discontinuous portions and the second light flux passing through the discontinuous portions, and to provide a substantial phase change to the third light flux passing through the discontinuous portions.

6. The objective optical element of claim 5, wherein the objective optical element satisfies, $$4.7 \times d \leq d1 \leq 5.3 \times d$$

$$2 \leq m1 \leq 5$$

where n1 is a refractive index of the objective optical element comprising the first optical path difference providing structure for the wavelength $\lambda 1$, d1 is a depth along the optical axis of the groove of the first optical path difference providing structure, m1 is an integer number and a number of the discontinuous portions, and $d = \lambda 1/(n1-1)$.

7. The objective optical element of claim 1, which satisfies L=2, M=1, N=1.

8. The objective optical element of claim 1, which satisfies L=6, M=4, N=3.

9. The objective optical element of claim 1, which satisfies L=8, M=5, N=4.

10. The objective optical element of claim 1, which satisfies L=10, M=6, N=5.

11. The objective optical element of claim 1, which satisfies $\eta 1 > 80\%$, $\eta 2 > 70\%$, $\eta 3 > 80\%$, wherein
$\eta 1$ is a diffraction efficiency of the L-th order diffracted light flux with a wavelength $\lambda 1$ passing through the second optical path difference providing structure,
$\eta 2$ is a diffraction efficiency of the M-th order diffracted light flux with a wavelength $\lambda 2$ passing through the second optical path difference providing structure, and
$\eta 3$ is a diffraction efficiency of the N-th order diffracted light flux with a wavelength $\lambda 3$ passing through the second optical path difference providing structure.

12. The objective optical element of claim 1, which satisfies following expressions, $$370 nm < \lambda 1 < 450 nm$$

$$620 nm < \lambda 2 < 690 nm$$

$$750 nm < \lambda 3 < 830 nm.$$

13. The objective optical element of claim 1, comprising two elements of a first optical element arranged at a light-source side, and a second optical element arranged at an optical information recording medium side.

14. The objective optical element of claim 13, wherein the first optical path difference providing structure is arranged on the first optical element, and
the second optical path difference providing structure is arranged on the second optical element.

15. The objective optical element of claim 13, wherein
the first optical path difference providing structure is arranged on one surface of the first optical element and
the second optical path difference providing structure is arranged on an opposite surface of the first optical element.

16. The objective optical element of claim 13, wherein the first optical path difference providing structure is arranged on a light-source side optical surface on the first optical element.

17. The objective optical element of claim 13, satisfying the following expressions, $$|f12/f11|<0.1 \text{ and } |1/f11|<0.02$$

wherein f11 is a focal length of the first optical element for the wavelength $\lambda 1$, and f12 is a focal length of the second optical element for the wavelength $\lambda 1$.

18. The objective optical element of claim 13, wherein at least one surface of the first optical element has a paraxial curvature radius which is almost infinity.

19. The objective optical element of claim 1, further comprising a third optical path difference providing structure which comprises a plurality of ring-shaped zones whose centers are on an optical axis and has a serrated cross sectional shape along an optical axis, wherein
when the light flux with the wavelength $\lambda 1$ passes through the ring-shaped zones, the third optical path difference providing structure provides P times as much as optical path difference of the wavelength $\lambda 1$,
when the light flux with the wavelength $\lambda 2$ passes through the ring-shaped zones, the third optical path difference providing structure provides Q times as much as optical path difference of the wavelength $\lambda 2$, and
a combination of P and Q satisfies P=5 and Q=3; P=8 and Q=5; or P=10 and Q=6, where P and Q are natural numbers.

20. The objective optical element of claim 19, wherein
when the first optical path difference providing structure satisfies the first optical path difference function $\phi_1(h)$,
where $\phi_1(h)=(A_2 \times h^2+A_4 \times h^4 \ldots +A_{2i} \times h^{2i}) \times \lambda \times M$, h is a height from the optical axis, $A_{2i}$ is a coefficient of the optical path difference function, i is a natural number, and $\lambda$ is a blaze wavelength,
the third optical path difference providing structure satisfies the second optical path difference function $\phi(h)$,
where $\phi(h)=(B_2 \times h^2+B_4 \times h^4+ \ldots +B_{2i} \times h^{2i}) \times \lambda \times P$, h is a height from the optical axis, $B_{2i}$ is a coefficient of the optical path difference function, i is a natural number, and $\lambda$ is a blaze wavelength,
a sign of $\phi_1(hmax)$ in which $A_2=0$ is substituted for a coefficient of the first optical path difference function is different from a sign of $\phi(hmax)$ in which $B_2=0$ is substituted for a coefficient of second optical path difference function,
where hmax is a height along an optical axis and a numerical aperture of the first optical information recording medium.

21. The objective optical element of claim 20, wherein the coefficient $A_2$ of the first optical path difference providing structure is not zero.

22. The objective optical element of claim 20, wherein the coefficient $B_2$ of the second optical path difference providing structure is not zero.

23. The objective optical element of claim 1, wherein a distance along the optical axis between a focal position of a N-th order diffracted light flux for information recording and/or reproducing on the third optical information recording medium and a focal position of a (N +1)-th order diffracted light flux for information recording and/or reproducing on the third optical information recording medium is 0.01 mm or more.

24. The objective optical element of claim 1, wherein at least one optical surface of the objective optical element has an aperture limit function corresponding to a wavelength of a light flux passing through the objective optical element.

25. The objective optical element of claim 24, wherein the aperture limit function is a dichroic filter transmitting a light flux with a predetermined wavelength.

26. The objective optical element of claim 24, wherein the aperture limit function makes a light flux with a predetermined wavelength to flare light using the diffractive structure.

27. The objective optical element of claim 26,
wherein at least one optical surface of the objective optical element comprises at least two areas of a central area which includes the optical axis and has a concentric circle shape whose center is on the optical axis, and
a peripheral area arranged around the central area and having the diffractive structure which makes the light flux with the predetermined wavelength into flare light, and
the peripheral area makes a light flux with a wavelength $\lambda 3$ passing through the peripheral area into flare light.

28. The objective optical element of claim 27, wherein at least one optical surface of the objective optical element comprises an outer peripheral area arranged in periphery of the peripheral area which includes the optical axis and has a concentric circle shape whose center is on the optical axis, and makes a light flux with a wavelength $\lambda 1$ or $\lambda 2$ passing through the outer peripheral area into flare light.

29. The objective optical element of claim 27, wherein the central area comprises the first optical path difference providing structure.

30. An optical pickup apparatus comprising:
a first light source emitting a first light flux with a first wavelength $\lambda 1$ for recording and/or reproducing information on an information recording surface of a first optical information recording medium having a protective layer with a thickness t1;
a second light source emitting a second light flux with a second wavelength $\lambda 2$ ($\lambda 1 < \lambda 2$) for recording and/or reproducing information on an information recording surface of a second optical information recording medium having a protective layer with a thickness t2 (t1≦t2);
a third light source emitting a third light flux with a third wavelength $\lambda 3$ ($\lambda 2 < \lambda 3$) for recording and/or reproducing information on an information recording surface of a third optical information recording medium having a protective layer with a thickness t3 (t2 <t3); and
a light converging optical system having an objective optical element comprising:
a first optical path difference providing structure for providing an optical path difference which provides a substantial phase change to the third light flux and does not provide a substantial phase change to the first and second light fluxes: and
a second optical path difference providing structure for providing an optical path difference to the first light flux, the second light flux and the third light flux,
wherein the objective optical element converges the first - third light fluxes through the protective layers with the thicknesses t1- t3 onto an information recording surface of the first - third optical information media respectively, and
wherein the second optical path difference providing structure has a serrated cross sectional shape and generates a L-th order diffracted light flux for being formed into a converged spot on the first optical information recording medium, a M-th order diffracted light flux for being formed into a converged spot on the second optical information recording medium, a N-th order diffracted light flux for being formed into a converged spot on the third optical information recording medium, where N is an integer number, L is 2N, and M is an integer number.

* * * * *